April 18, 1950 H. A. IAMS 2,504,333

RADIO WAVE DEVICE

Filed April 29, 1944 2 Sheets-Sheet 1

INVENTOR.
HARLEY A. IAMS
BY
C D Tuska
ATTORNEY

RADIO WAVE DEVICE

Filed April 29, 1944

2 Sheets-Sheet 2

INVENTOR.
HARLEY A. IAMS
BY C D Tuska
ATTORNEY

Patented Apr. 18, 1950

2,504,333

UNITED STATES PATENT OFFICE 2,504,333

RADIO WAVE DEVICE

Harley A. Iams, Princeton, N. J., assignor to Radio Corporation of America, a corporation of Delaware Application April 29, 1944, Serial No. 533,311

18 Claims. (Cl. 250—33.63)

This invention relates to radio wave devices and more particularly to an improved device for focusing radio waves.

It is known that radio waves may be focused by lenses formed of wave refractive material. While such lenses may be used, the refractive materials often substantially and undesirably attenuate the waves and this is especially true of known materials with respect to waves of the order of a centimeter length. The principle of lens operation in the case of both light and radio waves is based upon the difference between the wave propagation rates in the ambient and in the refractive material. While light waves are usually refracted by them passing through a region of different effective density, it has been discovered that radio frequency waves may be focused with an absence or minimum of attenuation and aberration, according to one form of the instant invention, by a device in which the waves are propagated at substantially the same velocity in the ambient and in the device. Moreover, the device is especially useful in focusing radio frequency waves in a region which may be scanned by a rotatable wave guide.

One of the objects of the invention is to provide an improved means for focusing radio waves. Another object is to provide an improved radio wave device in which the waves may be focused without the use of wave refractive material. Another object is to provide an improved device for focusing radio waves whereby a plane wave front may be applied to a linear aperture and focused in an annular region which may be readily scanned. An additional object is to provide an improved focusing device which may be used with or without wave refractive materials. A further object is to provide a radio wave focusing device in which the waves are applied in one space plane and focused in a different space plane. A still further object is to provide a radio wave focusing device characterized by low losses and by substantial freedom from aberration.

Figures 1, 2, 3, 4, 5, 6, 7, 8:
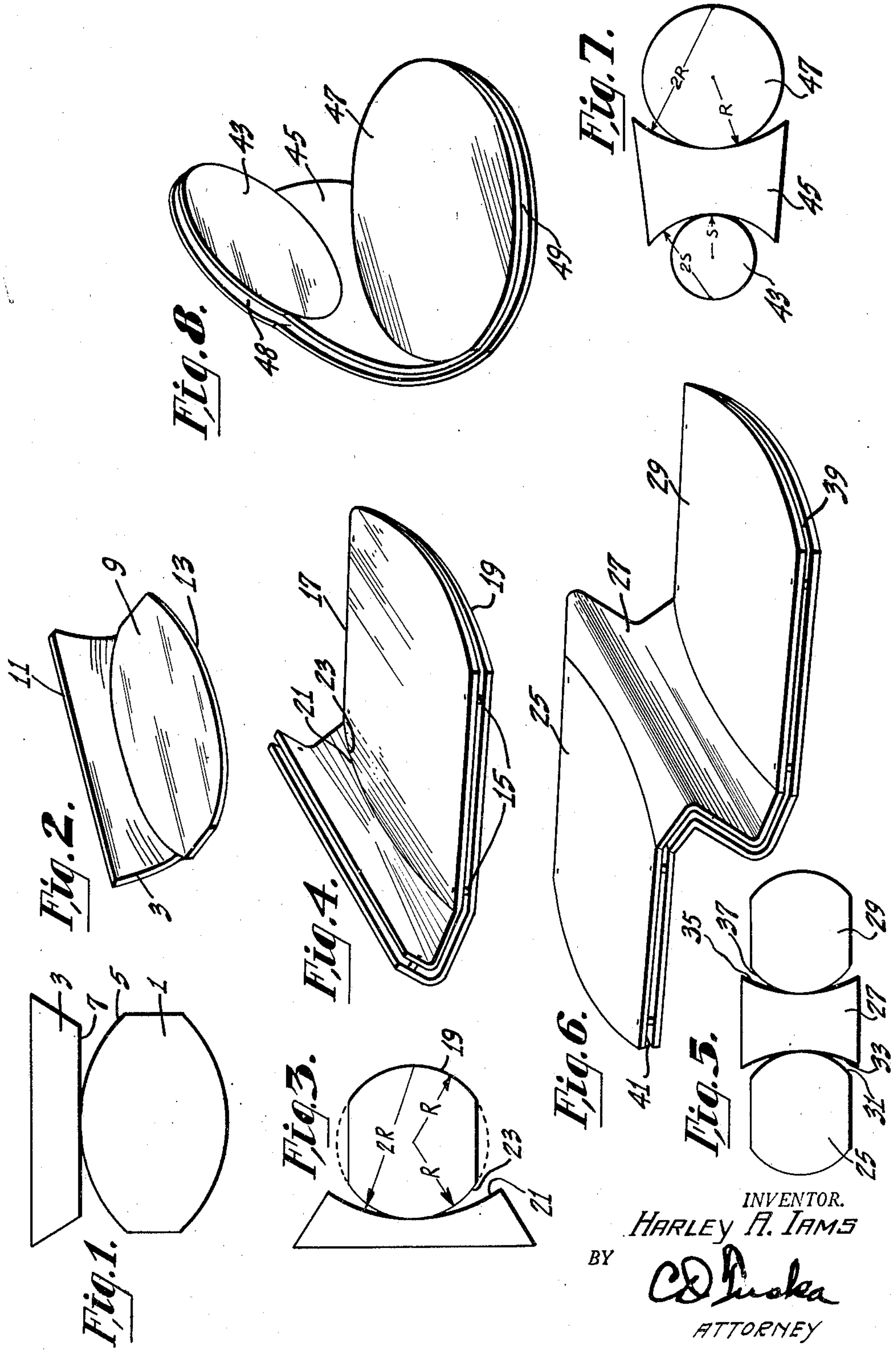
Figures 9, 10, 11, 12:
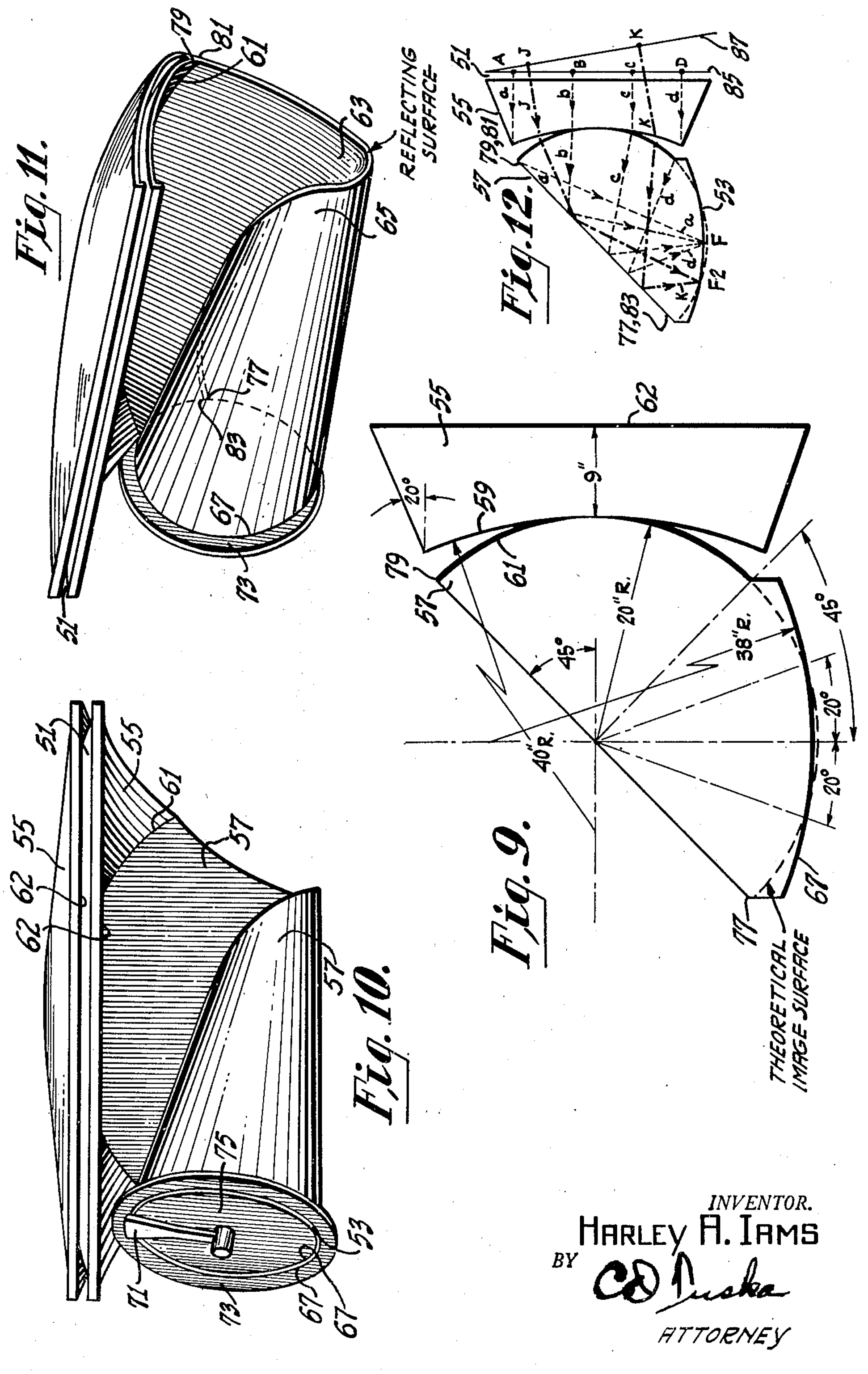

The invention will be described by referring to the accompanying drawings in which Figure 1 is a plan view of the unformed conductive sheets and insulative sheets of one form of the invention; Figure 2 is a perspective view of a device embodying the sheets of Fig. 1; Figures 3 and 4 are respectively a plan view of the unformed conductive sheets of a modification of the invention and a perspective view of the modification; Figures 5 and 6 are views of a connected pair of the sheets and devices corresponding respectively to Figs. 3 and 4; Figures 7 and 8 are respectively a plan view of the unformed sheets and a perspective view of a modification of the device illustrated in Figs. 5 and 6; Figure 9 is a plan view of the unformed sheets used in the device illustrated in Figures 10 and 11 which are respectively front and rear perspective views of a modification of the invention; and Figure 12 is a graphic illustration of the focusing action of the device shown in Figs. 10 and 11.

Referring to Figs. 1 and 2, a pair of members 1, 3 of insulation material such as polystyrene having a low loss with respect to ultra high frequency waves are shaped as follows: One of the members 1 has circular edges which are defined by a finite radius; the other member 3 is of trapezoidal form and its parallel sides are defined by a radius of infinite length. In any event the two members are united by cementing the edges 5 and 7, which are defined by different geometrical characteristics, to form the focusing device of Fig. 2. The parallel surfaces are coated with a conductive material 9, such as copper, tin or silver, which may be applied by chemical deposition, sputtering or spraying. Also, the conductors may be separately formed by uniting sheets of copper corresponding to the forms illustrated in Figs. 1 and 2. The conductive sheets are preferably spaced the order of a half wave length or less as measured in the material between the sheets. The conductors and the insulating material are spaced, curved and dimensioned: (A) so that an aperture 11 which is linear in form is included between the conductors 9 on the sheet 3; (B) so that a focal region 13 is included between the conductors 9 on the sheet 1; and (C) so that in the focal region a point can be found which is disposed equally distant in transit time from all points in a plane wave front which is polarized to pass the aperture.

Factors which determine the dimensions will now be discussed. The focal length of such a wave focusing system is determined by the radius of curvature of edge 7 and of edge 5. If these radii are called R5 and R7, respectively, the focal length of the combination is $$\frac{1}{\frac{1}{R5}+\frac{1}{R7}}$$

Thus, in Fig. 1, the radius of edge 7 is infinite, so the focal length of the combination is equal to the radius of curvature of edge 5. Further, the radius of curvature is taken to be negative when the edge of the sheet is concave, as edge 21 in Fig. 3. Therefore, it is possible, if desired, to make a combination which has many of the properties of a negative lens. This is done by making the radius of curvature negative for both edge 5 and edge 7, or by making one radius positive and one negative with the negative radius shorter. These particular arrangements are not illustrated.

The proportions shown in Fig. 1 are effective for aberration-free focusing of radiation moving parallel to the axis in piece 3 and brought to a focus in region 13 of piece 1. There are many shapes other than arcs of circles which can also be used to focus the radiation from a given direction at a given point. If the focal point and the shape of one of the edges are given, the shape of the other edge can be computed by making it such that the distance from every part of the advancing wave front to the focal point is the same.

In general, the focusing system so determined will not be wholly free from aberration for angles of incidence other than the one for which it was designed. Thus, the focusing properties of the device illustrated in Figs. 1 and 2 are quite good for small angles off the axis, but deteriorate for large angles. The proportions shown in Figs. 3 and 4 are particularly desirable, in that the focus is not appreciably impaired even when the source of radiation is as much as 30° off the axis. In this arrangement the edge 23 is cut along a circle of radius R, while edge 21 is cut with a radius 2R, where R is any desired length. For this combination the focal length is 2R, and the image is formed along edge 19.

Dielectric material was described in connection with the device of Fig. 2, since its use causes the energy to be focused into a smaller spot. This comes about because the final limit on spot size is a function of wave length, and this is inversely proportional to the square root of the dielectric constant of the material used. However, it is usually preferable to omit solid dielectrics because even the best available material attenuates radio waves having a length of the order of a centimeter. The omission of the dielectric may be effected by the including of small spacers 15 between the sheets 17 and 19 as shown in Fig. 4. In the focusing system of Fig. 4, the conductors are composed of two pairs of sheets in which the juxtaposed edges 21, 23 are joined by soldering, brazing or the like. To avoid reflection of the waves traveling around this corner, the interior surfaces are preferably smoothed and somewhat rounded during the joining operation. The edges to be joined are defined by different radii of curvature. This geometric characteristic requires the curving or bending of one or both sheets. Since the distances to the focal region are determined by the surface dimensions, it follows that simple or complex curvatures may be used without changing the focus. This makes it possible to dispose the aperture in one plane and the focal region in a different plane. It has been found that, when the pairs of sheets are spaced by less than one half wave length and the radiation is polarized with its electric vector perpendicular to the sheets, the speed of propagation of the wave is substantially the same as in free space and independent of the spacing between the sheets. Under these conditions the sheets can be bent or otherwise deformed without material effect upon the waves between them, as long as the distortion in a wave length of distance is not great.

The focusing systems illustrated in Figs. 2 and 4 are designed to focus radio waves which may be transmitted to or received from objects at infinite distances. The invention may be applied to focusing devices in which the object or a portion thereof may be located at the aperture. This may be accomplished by arranging two of the devices shown in Fig. 4 with their straight line apertures connected together. Such an arrangement is illustrated in Figs. 5 and 6 in which the sheets 25 and 27, and 27 and 29 are united by connecting together the edges 31, 33 and 35, 37 which are of different geometrical characteristics. The intermediate portion 27 may be curved reversely (as shown) or curved in the same direction according to whether the aperture 39 and the focal region 41 are to be juxtaposed or to be positioned oppositely (as shown). In the device of Fig. 6, the aperture and the focal region may be interchanged. The device illustrated in Figs. 7 and 8 is substantially the same as that of Fig. 6 except that the sheets 43, 47 are of circular shape. The intermediate sheet 45 is shaped to make the radio wave transit times (or the distances) from points in the aperture 49 equally distant from conjugate points in the focal region 48. The radius (2R) of curvature of the edge of the sheet 45 which is in contact with sheet 47 is preferably twice the radius (R) of 47, and the radius (2S) of the edge of 45 in contact with 43 is preferably twice the radius (S) of 43. The curvature of the intermediate portion is that required to connect the edges of dissimilar geometrical characteristics.

An embodiment of the invention especially suitable for focusing the waves applied to a linear aperture 51 to a focal region 53 disposed in a plane and bounded by an annulus is shown in Figs. 9, 10 and 11. Two pairs of conductive sheets 55, 57 of the dimensions shown in Fig. 9 are each connected together along the edges 59, 61 which have radii of 40 inches and 20 inches, respectively. Each sheet 55 is bent to bring together the edges 59 and 61 and to make the edge 62 of linear disposition. The pairs of united sheets 55, 57 are then brought into juxtaposition and are spaced not over one half wave length by any suitable spacing means (not shown). The pairs of sheets are then curved about a developable surface, for example as illustrated, a cone so that the curved edges 67 become a portion of the base of the conic surface and form the annulus which bounds the focal region 53. In this manner the focal region is disposed in a plane and is arranged for scanning as by a rotating wave guide 71. The edges 67 are cut with a radius of curvature which is somewhat different from the theoretical radius of curvature of the image, for convenience in scanning. When the two curves were made to coincide at the 20° angle, it was found that the scanned surface was near enough the image surface for all practical purposes. The annulus of the focal region may be stiffened by a ring 73 and a disc 75.

While the device illustrated in Figs. 10 and 11 will focus a plane wave front as in the case of the other arrangements of Figs. 2, 4, 6 and 8, the instant arrangement uses a wave reflecting surface intermediate the aperture and the focal region to make it easier to form edges 67 into an annulus. The reflecting surface is included in the region bounded by the lines 77, 79, 81 and 83 (Fig. 11). Therefore in determining that the distances from all points in a suitably polarized wave front are equally distant from a point in the focal plane, the radio wave energy must follow the path from the wave front through the aperture, between the conductive sheets, to the reflector and from the reflector to the focal plane. In the described device the spacing between sheets was approximately $\frac{3}{16}$ inch for waves of 24,000 megacycles (wavelength=½ inch) and the focal length was 40 inches. Experiments showed that the device was substantially free from aberration for all angles scanned by the rotating arm.

It may be noted in passing that the use of a diagonal reflector, as described above, to make possible the rolling of the focal region into a circle which can be scanned easily is not limited by the method used to focus the waves. This part of the invention could be used, for example, with a lens of wave refracting material placed between the sheets 57 near the edge 61. The radii of the curved edges 59, 61 might be large, so that most of the focusing action would be exerted by the lens. Or portion 55 might even be omitted entirely by using a lens of the right focal length.

Figure 12 represents one of the wave guiding surfaces 55, 57 (shown on a reduced scale), the aperture 51, the reflecting surface 77, 79, 81, 83, the focal region 53, and a wave front 85. By way of example A, B, C and D are points in the wave front, and lines *a*, *b*, *c* and *d* are the paths travelled by the points in the moving wave front in reaching the focal point F. It may be seen by inspection or determined by actual measurement that the path lengths are substantially equal. In a similar manner it can be shown that points J and K in another wave front 87 are equally distant from the focal point F2. It follows that focusing is obtained with respect to waves approaching the aperture from within the angular limits for which the device was designed.

Thus the invention has been described as a device for focusing radio waves by guiding the waves between conductive sheets which include an aperture and a focal region. The sheets are provided with a curved region intermediate the aperture and the focal region. The radio wave path lengths through the aperture and between the sheets to the focal region are chosen so that the time required for all points in a wave front to travel to a point in the focal region is the same. While almost any type of curvature may be employed, it is preferable to avoid extremely sharp bends. Since aberration may be avoided by proper design, it is usually unnecessary to include any dielectric material to correct for undesired distortion. However, low loss dielectric materials in the shape of lenses, prisms, or the like may be used to alter the shape of the image surface, to change the direction of the wave front, or to supplement the focusing properties of the system described.

Although the described focusing systems are bounded by metal sheets spaced less than one half wave length (because the most useful result has been obtained in this way) variations in structure may be used without departing from the spirit of the invention. For example, the structure may be made wholly of dielectric material, as described in connection with Figs. 1 and 2 but without the conductive coating. In this case the dielectric alone is often sufficient to direct the energy in the desired manner, without the use of the conductors. Or, as another variation, the spacing between the conducting sheets may be made greater than one half wave length. In this case it is important that the spacing between the sheets be held constant throughout the structure when the radiation is polarized with its electric vector parallel with the sheets.

I claim as my invention:

1. A radio frequency focusing device consisting of a pair of wave guiding members, means joining said members, an aperture region located in one of said members and a focal region located in the other of said members, said members including also a curved portion intermediate said aperture and said focal region and having an effective length such that a point in the focal region is equally distant in transit time from all points in a plane wave front polarized to pass said aperture.

2. A radio wave device consisting of two wave guiding members, one of said members having an edge of which a portion is defined by one geometrical characteristic, the other of said members having an edge of which a portion is defined by a different geometrical characteristic, said edge portion of one geometrical characteristic being united with said edge portion of said other geometrical characteristic to form a wave focusing device in which the aperture is included in the said edge included in one of said wave guiding members and the focal region is included in the said edge included in the other wave guiding member, the wave transit time between said members from all points in a plane wave front polarized to pass said aperture to said focal region being the same.

3. A radio wave device consisting of two wave guiding sheets, one of said sheets having an edge including a portion having one radius of curvature, the other of said sheets having an edge including a portion having a different radius of curvature, one of said sheets being curved so that the edge portions of different radii of each of said sheets meet whereby the two sheets form a single sheet in which is included in said edge having one radius of curvature a linear aperture and in which is included in said edge having a different radius of curvature a focal region for said waves, the wave transit time between said members from all points in a plane wave front polarized to pass said aperture to said focal region being the same.

4. A radio frequency focusing device consisting of a pair of juxtaposed wave guiding members, said members including respectively at their oppositely disposed portions a rectangular aperture and a focal plane, and including a hollow conical portion in which the base is an annular region including said focal plane.

5. An ultra high frequency rado wave focusing device consisting of a dielectric material having substantially parallel sides each including a metallic coating for guiding the waves within said dielectric, said coatings and dielectric being arranged to form a linear aperture and a curvilinear focal region, and including a curved section interposed between said aperture and said curvilinear focal region whereby all points in a plane wave front polarized to pass said aperture are equally distant in transit time from a focal point in said focal region.

6. A focusing device for ultra high frequency radio waves consisting of a dielectric material having substantially parallel sides each including a metallic coating for guiding the waves within said dielectric, said coating and dielectric being arranged to form a linear aperture and a curvilinear focal region, and including a curved section interposed between said aperture and said curvilinear focal region whereby all conjugate points in said aperture are equally distant from all corresponding conjugate points in said focal region.

7. A radio wave device consisting of two pairs of spaced conductive members, the members of one of said pairs each having an edge defined by one geometrical characteristic, the members of the other of said pairs each having an edge defined by a different geometrical characteristic, each of said edges of one geometrical characteristic being united with each of the edges of said other geometrical characteristic thereby to form a single pair of spaced parallel conductive sheets including an aperture and a focal region for said waves, said aperture and focal region being respectively located in oppositely disposed portions of said single pair of spaced conductive sheets, the wave transit time between said sheets for a plane wave front entering said aperture at any point to the point of arrival of the wave at said focal region being the same for all aperture points, and a dielectric material interposed between said sheets.

8. A radio wave device consisting of two pairs of spaced conductive members, the members of one of said pairs each having an edge defined by one geometrical characteristic, the members of the other of said pairs each having an edge defined by a different geometrical characteristic, each of said edges of one geometrical characteristic being united with each of the edges of said other geometrical characteristic thereby to form a single pair of spaced conductive sheets including an aperture and a focal region for said waves the wave transit time between said members from all points in a plane wave front polarized to pass said aperture to said focal region being the same.

9. A radio wave device consisting of two pairs of spaced conductive sheets, the sheets of one of said pairs having juxtaposed edges having one radius of curvature and including between said sheets and at juxtaposed edges thereof an aperture, the sheets of the other of said pairs having juxtaposed edges having a different radius of curvature and including between said sheets and at juxtaposed edges thereof a focal region, the sheets of one of said pairs being curved so that the edges having different radii of curvature meet whereby the two pairs of sheets form a single pair of spaced conductive sheets, the transit time for all portions of a plane wave front polarized normal to said sheets entering said aperture and travelling to said focal region being the same.

10. A radio wave device consisting of two pairs of spaced conductive sheets, the sheets of one of said pairs having juxtaposed edges having one radius of curvature, the sheets of the other of said pairs having juxtaposed edges having a different radius of curvature, the sheets of one of said pairs being curved so that the edges of different radii of each of said sheets meet whereby the two pairs of sheets form a single pair of spaced conductive sheets in which are included at oppositely disposed pairs of edges thereof a linear aperture and a focal region for said waves, the transit time for all portions of a plane wave front polarized normal to said sheets entering said aperture and travelling to said focal region being the same.

11. A radio wave device consisting of two pairs of spaced conductive sheets, the sheets of one of said pairs having juxtaposed edges having one radius of curvature and including between said sheets an aperture, the sheets of the other of said pairs having juxtaposed edges having a different radius of curvature and including between said sheets a focal region, the sheets of one of said pairs being curved so that the edges having different radii of curvature meet whereby the two pairs of sheets form a single pair of spaced conductive sheets, said focal region being the locus of points disposed equally distant in transit time from all points in any particular plane wave front polarized to pass said aperture.

12. A radio wave device consisting of two pairs of spaced conductive sheets, the sheets of one of said pairs having juxtaposed edges having one radius of curvature, the sheets of the other of said pairs having juxtaposed edges having a different radius of curvature, the sheets of one of said pairs being curved so that the edges of different radii of each of said sheets meet whereby the two pairs of sheets form a single pair of spaced conductive sheets in which are included a linear aperture and a focal region for said waves, the curvature of said sheets providing paths for said wave such that all points in any plane wave front polarized to pass said aperture are equally distant in transit time from a focal point in said focal region.

13. A radio wave device consisting of two pairs of spaced conductive sheets spaced substantially one half wave length or less of the applied waves, the sheets of one of said pairs having juxtaposed edges having one radius of curvature, the sheets of the other of said pairs having juxtaposed edges having a different radius of curvature, the sheets of one of said pairs being curved so that the edges having different radii of curvature meet whereby the two pairs of sheets form a single pair of conductive sheets spaced substantially one half wave length or less of the applied waves and include a portion in which the sheets are flat and a portion in which the sheets are curved, and said single pair of sheets having oppositely disposed therein an aperture and a focal region, one in the curved portion and one in the flat portion, said focal region being the locus of points equally distant in wave transit time from each portion of a plane wave front polarized to pass through said aperture between said sheets.

14. A radio wave device consisting of two pairs of spaced conductive sheets, the sheets of one of said pairs having juxtaposed edges having one radius of curvature and including between said sheets an aperture, the sheets of the other of said pairs having juxtaposed edges having a different radius of curvature and including between said sheets a focal region at least partially defined by a curve, the sheets of one of said pairs being curved so that the edges having different radii of curvature meet whereby the two pairs of sheets form a single pair of spaced conductive sheets, said single pair of sheets including a region corresponding to a curved developable surface whereby said focal region defined by a curve becomes a region defined by an annulus disposed substantially in a plane, the transit time for all portions of a plane wave front entering between said sheets at said aperture and travelling therebetween to said focal region being the same.

15. A radio wave device consisting of two pairs of spaced conductive sheets, the sheets of one of said pairs having juxtaposed edges having one radius of curvature, the sheets of the other of said pairs having juxtaposed edges having a different radius of curvature, the sheets of one of said pairs being curved so that the edges having different radii of curvature meet whereby the two pairs of sheets form a single pair of spaced conductive sheets, a wave reflective surface disposed between said sheets, an aperture disposed adjacent the edges of one of said sheets and a focal region disposed adjacent the edges of the other of said sheets, said aperture and focal region being disposed on opposite sides of said reflector, the wave transit time of all portions of a plane wave front entering between said sheets at said aperture and travelling therebetween to said focal region being the same.

16. A radio wave device consisting of two pairs of spaced conductive sheets, the sheets of one of said pairs having juxtaposed edges having one radius of curvature and including between said sheets an aperture, the sheets of the other of said pairs having juxtaposed edges having a different radius of curvature and including between said sheets a focal region at least partially defined by a curve, the sheets of one of said pairs being curved so that the edges having different radii of curvature meet whereby the two pairs of sheets form a single pair of spaced conductive sheets, said single pair of sheets including a region corresponding to a curved developable surface whereby said focal region defined by a curve becomes a region defined by an annulus disposed substantially in a plane, and a wave reflective surface disposed between said aperture and said focal region the wave transit time of any portion of a plane wave front polarized to enter between said sheets at said aperture and travelling therefrom to said wave reflective surface and thence reflected to said focal region being the same.

17. A radio wave focusing device consisting of two wave guiding members, one of said members having an edge with a radius R, the other having an edge with radius 2R, said edges being joined to form a single device including a curved portion and a flat portion containing respectively an aperture and a focal region whereby waves applied to the aperture are focused in the focal region.

18. A device for focusing radio frequency waves consisting of a pair of wave guiding members including respectively and adjacent oppositely disposed edges thereof an aperture and a focal region, means for focusing said waves in a point included with said focal region, and means interposed between said aperture and said focal region for reflecting said waves.

HARLEY A. IAMS.

REFERENCES CITED

The following references are of record in the file of this patent:

UNITED STATES PATENTS

| Number | Name | Date |
|---|---|---|
| 2,255,042 | Barrow | Sept. 9, 1941 |
| 2,398,095 | Katzin | Apr. 9, 1946 |
| 2,408,033 | Beck | Sept. 24, 1946 |

OTHER REFERENCES

Hyper and Ultra High Frequency Engineering, by Sarbacher and Edson, published by John Wiley & Sons, Inc., New York; Copyrighted in 1943. Page 120, Fig. 5.1.